United States Patent
Bowers et al.

(10) Patent No.: US 9,843,103 B2
(45) Date of Patent: Dec. 12, 2017

(54) METHODS AND APPARATUS FOR CONTROLLING A SURFACE SCATTERING ANTENNA ARRAY

(71) Applicant: Elwha LLC, Bellevue, WA (US)

(72) Inventors: Jeffrey A. Bowers, Bellevue, WA (US); David Jones Brady, Durham, NC (US); Tom Driscoll, San Diego, CA (US); John Desmond Hunt, Knoxville, TN (US); Roderick A. Hyde, Redmond, WA (US); Nathan Ingle Landy, Mercer Island, WA (US); Guy Shlomo Lipworth, Durham, NC (US); Alexander Mrozack, Durham, NC (US); David R. Smith, Durham, NC (US); Clarence T. Tegreene, Mercer Island, WA (US)

(73) Assignee: Elwha LLC

( * ) Notice: Subject to any disclaimer, the term of this patent is extended or adjusted under 35 U.S.C. 154(b) by 426 days.

(21) Appl. No.: 14/485,316

(22) Filed: Sep. 12, 2014

(65) Prior Publication Data

US 2015/0276928 A1    Oct. 1, 2015

Related U.S. Application Data

(63) Continuation-in-part of application No. 14/226,213, filed on Mar. 26, 2014, now Pat. No. 9,448,305.

(51) Int. Cl.
*H01Q 19/10* (2006.01)
*G01S 13/88* (2006.01)
(Continued)

(52) U.S. Cl.
CPC .......... *H01Q 19/10* (2013.01); *G01S 13/887* (2013.01); *H01Q 3/24* (2013.01)

(58) Field of Classification Search
CPC ........ H01Q 3/24; H01Q 19/10; H01Q 25/007; G01S 13/88; G01S 13/887
See application file for complete search history.

(56) References Cited

U.S. PATENT DOCUMENTS

| | | |
|---|---|---|
| 3,001,193 A | 9/1961 | Marie |
| 3,388,396 A | 6/1968 | Rope et al. |
| (Continued) | | |

FOREIGN PATENT DOCUMENTS

| | | |
|---|---|---|
| JP | 52-13751 A | 2/1977 |
| WO | WO 01/73891 A1 | 10/2001 |
| (Continued) | | |

OTHER PUBLICATIONS

U.S. Appl. No. 14/102,253, filed Dec. 10, 2013, Bowers et al.
(Continued)

*Primary Examiner* — Bernarr E Gregory

(57) ABSTRACT

An array of scattering and/or reflector antennas are configured to produce a series of beam patterns, where in some embodiments the scattering antenna and/or the reflector antenna includes complementary metamaterial elements. In some embodiments circuitry may be configured to set a series of conditions corresponding to the array to produce the series of beam patterns, and to produce an image of an object that is illuminated by the series of beam patterns.

33 Claims, 7 Drawing Sheets

(51) Int. Cl.
  *H01Q 3/24* (2006.01)
  *H01Q 19/00* (2006.01)
  *H01Q 3/00* (2006.01)

(56) References Cited

U.S. PATENT DOCUMENTS

| | | | |
|---|---|---|---|
| 3,714,608 A | 1/1973 | Barnes et al. | |
| 3,757,332 A | 9/1973 | Tricoles | |
| 3,887,923 A | 6/1975 | Hendrix | |
| 4,195,262 A * | 3/1980 | King | G01S 13/88 342/360 |
| 4,291,312 A | 9/1981 | Kaloi | |
| 4,305,153 A * | 12/1981 | King | G01S 13/88 342/360 |
| 4,489,325 A | 12/1984 | Bauck et al. | |
| 4,509,209 A | 4/1985 | Itoh et al. | |
| 4,672,378 A | 6/1987 | Drabowitch et al. | |
| 4,701,762 A | 10/1987 | Apostolos | |
| 4,780,724 A | 10/1988 | Sharma et al. | |
| 4,832,429 A | 5/1989 | Nagler | |
| 4,874,461 A | 10/1989 | Sato et al. | |
| 4,920,350 A | 4/1990 | McGuire et al. | |
| 4,947,176 A | 8/1990 | Inatsune et al. | |
| 4,978,934 A | 12/1990 | Saad | |
| 5,198,827 A | 3/1993 | Seaton | |
| 5,455,590 A | 10/1995 | Collins et al. | |
| 5,512,906 A | 4/1996 | Speciale | |
| 5,734,347 A | 3/1998 | McEligot | |
| 5,841,543 A | 11/1998 | Guldi et al. | |
| 5,889,599 A | 3/1999 | Takemori | |
| 6,031,506 A | 2/2000 | Cooley et al. | |
| 6,061,023 A | 5/2000 | Daniel et al. | |
| 6,061,025 A | 5/2000 | Jackson et al. | |
| 6,075,483 A | 6/2000 | Gross | |
| 6,084,540 A | 7/2000 | Yu | |
| 6,114,834 A | 9/2000 | Parise | |
| 6,166,690 A | 12/2000 | Lin et al. | |
| 6,198,453 B1 | 3/2001 | Chew | |
| 6,211,823 B1 | 4/2001 | Herring | |
| 6,236,375 B1 | 5/2001 | Chandler et al. | |
| 6,275,181 B1 | 8/2001 | Kitayoshi | |
| 6,366,254 B1 | 4/2002 | Sievenpiper et al. | |
| 6,384,797 B1 | 5/2002 | Schaffner et al. | |
| 6,396,440 B1 | 5/2002 | Chen | |
| 6,469,672 B1 | 10/2002 | Marti-Canales et al. | |
| 6,545,645 B1 * | 4/2003 | Wu | H01Q 25/007 343/781 CA |
| 6,552,696 B1 | 4/2003 | Sievenpiper et al. | |
| 6,633,026 B2 | 10/2003 | Tuominen | |
| 6,985,107 B2 | 1/2006 | Anson et al. | |
| 7,068,234 B2 | 6/2006 | Sievenpiper | |
| 7,151,499 B2 | 12/2006 | Avakian et al. | |
| 7,154,451 B1 | 12/2006 | Sievenpiper | |
| 7,295,146 B2 | 11/2007 | McMakin et al. | |
| 7,307,596 B1 | 12/2007 | West | |
| 7,339,521 B2 | 3/2008 | Scheidemann et al. | |
| 7,428,230 B2 | 9/2008 | Park | |
| 7,456,787 B2 | 11/2008 | Manasson et al. | |
| 7,609,223 B2 | 10/2009 | Manasson et al. | |
| 7,667,660 B2 | 2/2010 | Manasson et al. | |
| 7,830,310 B1 | 11/2010 | Sievenpiper et al. | |
| 7,834,795 B1 | 11/2010 | Dudgeon et al. | |
| 7,864,112 B2 | 1/2011 | Manasson et al. | |
| 7,911,407 B1 | 3/2011 | Fong et al. | |
| 7,929,147 B1 | 4/2011 | Fong et al. | |
| 7,995,000 B2 | 8/2011 | Manasson et al. | |
| 8,009,116 B2 | 8/2011 | Peichl et al. | |
| 8,014,050 B2 | 9/2011 | McGrew | |
| 8,040,586 B2 | 10/2011 | Smith et al. | |
| 8,059,051 B2 | 11/2011 | Manasson et al. | |
| 8,134,521 B2 | 3/2012 | Herz et al. | |
| 8,179,331 B1 | 5/2012 | Sievenpiper | |
| 8,212,739 B2 | 7/2012 | Sievenpiper | |
| 8,339,320 B2 | 12/2012 | Sievenpiper | |
| 8,456,360 B2 | 6/2013 | Manasson et al. | |
| 9,231,303 B2 | 1/2016 | Edelmann et al. | |
| 9,268,016 B2 | 2/2016 | Smith et al. | |
| 9,389,305 B2 | 7/2016 | Boufounos | |
| 9,448,305 B2 * | 9/2016 | Bowers | G01S 13/887 |
| 9,634,736 B2 | 4/2017 | Mukherjee et al. | |
| 2002/0039083 A1 | 4/2002 | Taylor et al. | |
| 2003/0214443 A1 | 11/2003 | Bauregger et al. | |
| 2004/0227668 A1 | 11/2004 | Sievenpiper | |
| 2004/0263408 A1 | 12/2004 | Sievenpiper et al. | |
| 2005/0031295 A1 | 2/2005 | Engheta et al. | |
| 2005/0088338 A1 | 4/2005 | Masenten et al. | |
| 2006/0065856 A1 | 3/2006 | Diaz et al. | |
| 2006/0114170 A1 | 6/2006 | Sievenpiper | |
| 2006/0116097 A1 | 6/2006 | Thompson | |
| 2006/0132369 A1 | 6/2006 | Robertson et al. | |
| 2006/0187126 A1 | 8/2006 | Slevenpiper | |
| 2007/0085757 A1 | 4/2007 | Sievenpiper | |
| 2007/0103381 A1 | 5/2007 | Upton | |
| 2007/0159395 A1 | 7/2007 | Sievenpiper et al. | |
| 2007/0159396 A1 | 7/2007 | Sievenpiper et al. | |
| 2007/0182639 A1 | 8/2007 | Sievenpiper et al. | |
| 2007/0200781 A1 | 8/2007 | Ahn et al. | |
| 2007/0229357 A1 | 10/2007 | Zhang et al. | |
| 2008/0020231 A1 | 1/2008 | Yamada et al. | |
| 2008/0165079 A1 | 7/2008 | Smith et al. | |
| 2008/0180339 A1 | 7/2008 | Yagi | |
| 2008/0224707 A1 | 9/2008 | Wisler et al. | |
| 2008/0259826 A1 | 10/2008 | Struhsaker | |
| 2008/0268790 A1 | 10/2008 | Shi et al. | |
| 2008/0316088 A1 | 12/2008 | Pavlov et al. | |
| 2009/0002240 A1 | 1/2009 | Sievenpiper et al. | |
| 2009/0045772 A1 | 2/2009 | Cook et al. | |
| 2009/0109121 A1 | 4/2009 | Herz et al. | |
| 2009/0147653 A1 | 6/2009 | Waldman et al. | |
| 2009/0195361 A1 | 8/2009 | Smith | |
| 2009/0251385 A1 | 10/2009 | Xu et al. | |
| 2010/0066629 A1 | 3/2010 | Sievenpiper | |
| 2010/0073261 A1 | 3/2010 | Sievenpiper | |
| 2010/0079010 A1 | 4/2010 | Hyde et al. | |
| 2010/0109972 A2 | 5/2010 | Xu et al. | |
| 2010/0134370 A1 | 6/2010 | Oh et al. | |
| 2010/0156573 A1 | 6/2010 | Smith et al. | |
| 2010/0157929 A1 | 6/2010 | Karabinis | |
| 2010/0188171 A1 | 7/2010 | Mohajer-Iravani et al. | |
| 2010/0279751 A1 | 11/2010 | Pourseyed et al. | |
| 2010/0328142 A1 | 12/2010 | Zoughi et al. | |
| 2011/0098033 A1 | 4/2011 | Britz et al. | |
| 2011/0117836 A1 | 5/2011 | Zhang et al. | |
| 2011/0128714 A1 | 6/2011 | Terao et al. | |
| 2011/0151789 A1 | 6/2011 | Viglione et al. | |
| 2011/0267664 A1 | 11/2011 | Kitamura et al. | |
| 2012/0026068 A1 | 2/2012 | Sievenpiper | |
| 2012/0038317 A1 | 2/2012 | Miyamoto et al. | |
| 2012/0112543 A1 | 5/2012 | van Wageningen et al. | |
| 2012/0194399 A1 | 8/2012 | Bily et al. | |
| 2012/0219249 A1 | 8/2012 | Pitwon | |
| 2012/0268340 A1 | 10/2012 | Capozzoli et al. | |
| 2012/0274147 A1 | 11/2012 | Stecher et al. | |
| 2012/0280770 A1 | 11/2012 | Abhari et al. | |
| 2012/0326660 A1 | 12/2012 | Lu et al. | |
| 2013/0069865 A1 | 3/2013 | Hart | |
| 2013/0082890 A1 | 4/2013 | Wang et al. | |
| 2013/0237272 A1 | 9/2013 | Prasad | |
| 2013/0249310 A1 | 9/2013 | Hyde et al. | |
| 2013/0278211 A1 | 10/2013 | Cook et al. | |
| 2013/0288617 A1 | 10/2013 | Kim et al. | |
| 2013/0335256 A1 | 12/2013 | Smith et al. | |
| 2013/0343208 A1 | 12/2013 | Sexton et al. | |
| 2014/0128006 A1 | 5/2014 | Hu | |
| 2014/0266946 A1 | 9/2014 | Bily et al. | |
| 2015/0280444 A1 | 10/2015 | Smith et al. | |
| 2017/0098961 A1 | 4/2017 | Harpham | |

FOREIGN PATENT DOCUMENTS

| | | |
|---|---|---|
| WO | WO 2008/059292 A2 | 5/2008 |
| WO | WO 2009/103042 A2 | 8/2009 |

(56) References Cited

FOREIGN PATENT DOCUMENTS

WO    WO 2013/147470 A1    10/2013
WO    WO 2014/025425        2/2014

OTHER PUBLICATIONS

U.S. Appl. No. 13/838,934, filed Mar. 5, 2013, Bily et al.
Abdalla et al.; "A Planar Electronically Steerable Patch Array Using Tunable PRI/NRI Phase Shifters"; IEEE Transactions on Microwave Theory and Techniques; Mar. 2009; p. 531-541; vol. 57, No. 3; IEEE.
Amineh et al.; "Three-Dimensional Near-Field Microwave Holography for Tissue Imaging"; International Journal of Biomedical Imaging; Bearing a date of Dec. 21, 2011; pp. 1-11; vol. 2012, Article ID 291494; Hindawi Publishing Corporation.
"Array Antenna with Controlled Radiation Pattern Envelope Manufacture Method"; ESA; Jan. 8, 2013; pp. 1-2; http://www.esa.int/Our_Activities/Technology/Array_antenna_with_controlled_radiation_pattern_envelope_manufacture_method.
Belloni, Fabio; "Channel Sounding"; S-72.4210 PG Course in Radio Communications; Bearing a date of Feb. 7, 2006; pp. 1-25.
Chin J.Y. et al.; "An efficient broadband metamaterial wave retarder"; Optics Express; vol. 17, No. 9; p. 7640-7647; 2009.
Chu R.S. et al.; "Analytical Model of a Multilayered Meaner-Line Polarizer Plate with Normal and Oblique Plane-Wave Incidence"; IEEE Trans. Ant. Prop.; vol. AP-35, No. 6; p. 652-661; Jun. 1987.
Colburn et al.; "Adaptive Artificial Impedance Surface Conformal Antennas"; in Proc. IEEE Antennas and Propagation Society Int. Symp.; 2009; p. 1-4.
Courreges et al.; "Electronically Tunable Ferroelectric Devices for Microwave Applications"; *Microwave and Millimeter Wave Technologies from Photonic Bandgap Devices to Antenna and Applications*; ISBN 978-953-7619-66-4; Mar. 2010; p. 185-204; InTech.
Cristaldi et al., Chapter 3 "Passive LCDs and Their Addressing Techniques" and Chapter 4 "Drivers for Passive-Matrix LCDs"; *Liquid Crystal Display Drivers: Techniques and Circuits*; ISBN 9048122546; Apr. 8, 2009; p. 75-143; Springer.
Crosslink; Summer 2002; pp. 1-56 vol. 3; No. 2; The Aerospace Corporation.
Diaz, Rudy; "Fundamentals of EM Waves"; Bearing a date of Apr. 4, 2013; 6 Total Pages; located at: http://www.microwaves101.com/encyclopedia/absorbingradar1.cfm.
Elliott, R.S.; "An Improved Design Procedure for Small Arrays of Shunt Slots"; Antennas and Propagation, IEEE Transaction on; Jan. 1983; p. 297-300; vol. 31, Issue: 1; IEEE.
Elliott, Robert S. and Kurtz, L.A.; "The Design of Small Slot Arrays"; Antennas and Propagation, IEEE Transactions on; Mar. 1978; p. 214-219; vol. AP-26, Issue 2; IEEE.
Evlyukhin, Andrey B. and Bozhevolnyi, Sergey I.; "Holographic evanescent-wave focusing with nanoparticle arrays"; Optics Express; Oct. 27, 2008; p. 17429-17440; vol. 16, No. 22; OSA.
Fan et al.; "Fast-response and scattering-free polymer network liquid crystals for infrared light modulators"; Applied Physics Letters; Feb. 23, 2004; pp. 1233-1235; vol. 84, No. 8; American Institute of Physics.
Fong, Bryan H. et al.; "Scalar and Tensor Holographic Artificial Impedance Surfaces" IEEE Transactions on Antennas and Propagation; Oct. 2010; p. 3212-3221; vol. 58, No. 10; IEEE.
Frenzel, Lou; "What's the Difference Between EM Near Field and Far Field?"; Electronic Design; Bearing a date of Jun. 8, 2012; 7 Total Pages; located at: http://electronicdesign.com/energy/what-s-difference-between-em-near-field-and-far-field.
Grbic et al.; "Metamaterial Surfaces for Near and Far-Field Applications"; 7$^{th}$ European Conference on Antennas and Propagation (EUCAP 2013); Bearing a date of 2013, Created on Mar. 18, 2014; pp. 1-5.
Grbic, Anthony; "Electrical Engineering and Computer Science"; University of Michigan; Created on Mar. 18, 2014, printed on Jan. 27, 2014; pp. 1-2; located at: http://sitemaker.umich.edu/agrbic/projects.

Hand et al.; "Characterization of Complementary Electric Field Coupled Resonant Surfaces"; Applied Physics Letters; bearing a date of Oct. 2, 2008; pp. 1-3; vol. 93; Issue No. 212504; American Institute of Physics; 2008.
Imani, et al.; "A Concentrically Corrugated Near-Field Plate"; Bearing a date of 2010, Created on Mar. 18, 2014; pp. 1-4; IEEE.
Imani, et al.; "Design of a Planar Near-Field Plate"; Bearing a date of 2012, Created on Mar. 18, 2014; pp. 1-2; IEEE.
Imani, et al.; "Planar Near-Field Plates"; Bearing a date of 2013, Created on Mar. 18, 2014; pp. 1-10; IEEE.
Islam et al.; "A Wireless Channel Sounding System for Rapid Propagation Measurements"; Bearing a date of Nov. 21, 2012; 7 Total Pages.
Kaufman, D.Y. et al.; "High-Dielectric-Constant Ferroelectric Thin Film and Bulk Ceramic Capacitors for Power Electronics"; Proceedings of the Power Systems World/Power Conversion and Intelligent Motion '99 Conference; Nov. 6-12, 1999; p. 1-9; PSW/PCIM; Chicago, IL.
Kim, David Y.; "A Design Procedure for Slot Arrays Fed by Single-Ridge Waveguide"; IEEE Transactions on Antennas and Propagation; Nov. 1988; p. 1531-1536; vol. 36, No. 11; IEEE.
Kirschbaum, H.S. et al.; "A Method of Producing Broad-Band Circular Polarization Employing an Anisotropic Dielectric"; IRE Trans. Micro. Theory. Tech.; vol. 5, No. 3; p. 199-203; 1957.
Kokkinos, Titos et al.; "Periodic FDTD Analysis of Leaky-Wave Structures and Applications to the Analysis of Negative-Refractive-Index Leaky-Wave Antennas"; IEEE Transactions on Microwave Theory and Techniques; 2006; p. 1-12; ; IEEE.
Konishi, Yohei; "Channel Sounding Technique Using MIMO Software Radio Architecture"; 12$^{th}$ MCRG Joint Seminar; Bearing a date of Nov. 18, 2010; 28 Total Pages.
Kuki et al.; "Microwave Variable Delay Line using a Membrane Impregnated with Liquid Crystal"; IEEE MTT-S Digest; 2002; pp. 363-366; IEEE.
Leveau et al.; "Anti-Jam Protection by Antenna"; GPS World; Feb. 1, 2013; pp. 1-11; North Coast Media LLC; http://gpsworld.com/anti-jam-protection-by-antenna/.
Lipworth et al.; "Magnetic Metamaterial Superlens for Increased Range Wireless Power Transfer"; Scientific Reports; Bearing a date of Jan. 10, 2014; pp. 1-6; vol. 4, No. 3642.
Luo et al.; "High-directivity antenna with small antenna aperture"; Applied Physics Letters; 2009; pp. 193506-1-193506-3; vol. 95; American Institute of Physics.
Manasson et al.; "Electronically Reconfigurable Aperture (ERA): A New Approach for Beam-Steering Technology"; Bearing dates of Oct. 12-15, 2010; pp. 673-679; IEEE.
Mclean et al.; "Interpreting Antenna Performance Parameters for EMC Applications: Part 2: Radiation Pattern, Gain, and Directivity"; Created on Apr. 1, 2014; pp. 7-17; TDK RF Solutions Inc.
Ovi et al.; "Symmetrical Slot Loading in Elliptical Microstrip Patch Antennas Partially Filled with Mue Negative Metamaterials"; PIERS Proceedings, Moscow, Russia; Aug. 19-23, 2012; pp. 542-545.
PCT International Search Report; International App. No. PCT/US2014/017454; Aug. 28, 2014; pp. 1-4.
PCT International Search Report; International App. No. PCT/US2011/001755; Mar. 22, 2012; pp. 1-5.
Poplavlo, Yuriy et al.; "Tunable Dielectric Microwave Devices with Electromechanical Control"; *Passive Microwave Components and Antennas*; ISBN 978-953-307-083-4; Apr. 2010; p. 367-382; InTech.
Rengarajan, Sembiam R. et al.; "Design, Analysis, and Development of a Large Ka-Band Slot Array for Digital Beam-Forming Application"; IEEE Transactions on Antennas and Propagation; Oct. 2009; p. 3103-3109; vol. 57, No. 10; IEEE.
Sakakibara, Kunio; "High-Gain Millimeter-Wave Planar Array Antennas with Traveling-Wave Excitation"; Radar Technology; Bearing a date of Dec. 2009; pp. 319-340.
Sandell et al.; "Joint Data Detection and Channel Sounding for TDD Systems with Antenna Selection"; Bearing a date of 2011, Created on Mar. 18, 2014; pp. 1-5; IEEE.

(56) References Cited

OTHER PUBLICATIONS

Sato, Kazuo et al.; "Electronically Scanned Left-Handed Leaky Wave Antenna for Millimeter-Wave Automotive Applications"; Antenna Technology Small Antennas and Novel Metamaterials; 2006; p. 420-423; IEEE.
Siciliano et al.; "25. Multisensor Data Fusion"; Springer Handbook of Robotics; Bearing a date of 2008, Created on Mar. 18, 2014; 27 Total Pages; Springer.
Sievenpiper, Dan et al.; "Holographic Artificial Impedance Surfaces for Conformal Antennas"; Antennas and Propagation Society International Symposium; 2005; p. 256-259; vol. 1B; IEEE, Washington D.C.
Sievenpiper, Daniel F. et al.; "Two-Dimensional Beam Steering Using an Electrically Tunable Impedance Surface"; IEEE Transactions on Antennas and Propagation; Oct. 2003; p. 2713-2722; vol. 51, No. 10; IEEE.
Smith, David R.; "Recent Progress in Metamaterial and Transformation Optical Design"; NAVAIR Nano/Meta Workshop; Feb. 2-3, 2011; pp. 1-32.
Soper,Taylor; "This startup figured out how to charge devices wirelessly through walls from 40 feet away"; GeekWire; bearing a date of Apr. 22, 2014 and printed on Apr. 24, 2014; pp. 1-12; located at http://www.geekwire.com/2014/ossia-wireless-charging/#disqus_thread.
"Spectrum Analyzer"; Printed on Aug. 12, 2013; pp. 1-2; http://www.gpssource.com/faqs/15; GPS Source.
Sun et al.; "Maximum Signal-to-Noise Ratio GPS Anti-Jam Receiver with Subspace Tracking"; ICASSP; 2005; pp. IV-1085-IV-1088; IEEE.
Thoma et al.; "MIMO Vector Channel Sounder Measurement for Smart Antenna System Evaluation"; Created on Mar. 18, 2014; pp. 1-12.
Umenei, A.E.; "Understanding Low Frequency Non-Radiative Power Transfer"; Bearing a date of Jun. 2011; 7 Total Pages; Fulton Innovation, LLC.
Utsumi, Yozo et al.; "Increasing the Speed of Microstrip-Line-Type Polymer-Dispersed Liquid-Crystal Loaded Variable Phase Shifter"; IEEE Transactions on Microwave Theory and Techniques; Nov. 2005, p. 3345-3353; vol. 53, No. 11; IEEE.
Wallace, John; "Flat 'Metasurface' Becomes Aberration-Free Lens"; Bearing a date of Aug. 28, 2012; 4 Total Pages; located at: http://www.laserfocusworld.com/articies/2012/08/flat-metasurface-becomes-aberration-free-lens.html.
"Wavenumber"; Microwave Encyclopedia; Bearing a date of Jan. 12, 2008; pp. 1-2; P-N Designs, Inc.
Weil, Carsten et al.; "Tunable Inverted-Microstrip Phase Shifter Device Using Nematic Liquid Crystals"; IEEE MTT-S Digest; 2002; p. 367-370; IEEE.
Yan, Dunbao et al.; "A Novel Polarization Convert Surface Based on Artificial Magnetic Conductor"; Asia-Pacific Microwave Conference Proceedings, 2005.
Yee, Hung Y.; "Impedance of a Narrow Longitudinal Shunt Slot in a Slotted Waveguide Array"; IEEE Transactions on Antennas and Propagation; Jul. 1974; p. 589-592; IEEE.
Yoon et al.; "Realizing Efficient Wireless Power Transfer in the Near-Field Region Using Electrically Small Antennas"; Wireless Power Transfer; Principles and Engineering Explorations; Bearing a date of Jan. 25, 2012; pp. 151-172.
Young et al.; "Meander-Line Polarizer"; IEEE Trans. Ant. Prop.; p. 376-378; May 1973.
Zhong, S.S. et al.; "Compact ridge waveguide slot antenna array fed by convex waveguide divider"; Electronics Letters; Oct. 13, 2005; p. 1-2; vol. 41, No. 21; IEEE.
PCT International Search Report; International App. No. PCT/US2014/070645; dated Mar. 16, 2015; pp. 1-3.
PCT International Search Report; International App. No. PCT/US2014/070650; dated Mar. 27, 2015; pp. 1-3.
The State Intellectual Property Office of P.R.C.; Application No. 201180055705.8; May 6, 2015; pp. 1-11.
Intellectual Property Office of Singapore Examination Report; Application No. 2013027842; dated Feb. 27, 2015; pp. 1-12.
Fan, Guo-Xin et al.; "Scattering from a Cylindrically Conformal Slotted Waveguide Array Antenna"; IEEE Transactions on Antennas and Propagation; Jul. 1997; pp. 1150-1159; vol. 45, No. 7; IEEE.
Jiao, Yong-Chang et al.; A New Low-Side-Lobe Pattern Synthesis Technique for Conformal Arrays; IEEE Transactions on Antennas and Propagation; Jun. 1993; pp. 824-831, vol. 41, No. 6; IEEE.
PCT International Search Report; International App. No. PCT/US2015/028781; dated Jul. 27, 2015; pp. 1-3.
PCT International Search Report; International App. No. PCT/US2014/061485; dated Jul. 27, 2015; pp. 1-3.
PCT International Search Report; International App. No. PCT/US2015/036638; dated Oct. 19, 2015; pp. 1-4.
Patent Office of the Russian Federation (Rospatent) Office Action; Application No. 2013119332/28(028599); dated Oct. 13, 2015; machine translation; pp. 1-5.
The State Intellectual Property Office of P.R.C.; Application No. 201180055705.8; Nov. 4, 2015; pp. 1-11.
PCT International Search Report; International App. No. PCT/US2014/069254; dated Nov. 27, 2015; pp. 1-4.
Definition from Merriam-Webster Online Dictionary; "Integral"; Merriam-Webster Dictionary; pp. 1-5; located at: http://www.merriam-webster.com/dictionary/integral.
Varlamos et al.; "Electronic Beam Steering Using Switched Parasitic Smart Antenna Arrays"; Progress in Electromagnetics Research; PIER 36; bearing a date of 2002; pp. 101-119.
IP Australia Patent Examination Report No. 1; Patent Application No. 2011314378; dated Mar. 4, 2016; pp. 1-4.
Chinese State Intellectual Property Office, Notification of Fourth Office Action, App. No. 2011/80055705.8 (Based on PCT Patent Application No. PCT/US2011/001755); dated May 20, 2016; pp. 1-4 (machine translation only).
PCT International Search Report; International App. No. PCT/US2016/037667; dated Sep. 7, 2016; pp. 1-3.
European Search Report; European App. No. EP 11 832 873.1; dated Sep. 21, 2016; pp. 1-6.
Extended European Search Report; European App. No. EP 14 77 0686; dated Oct. 14, 2016; pp. 1-7.
The State Intellectual Property Office of P.R.C, Fifth Office Action, App. No. 2011/80055705.8 (Based on PCT Patent Application No. PCT/US2011/001755); dated Nov. 16, 2016; pp. 1-3 (machine translation, as provided).
Canadian Intellectual Property Office, Canadian Examination Search Report, Pursuant to Subsection 30(2); App. No. 2,814,635; dated Dec. 1, 2016; pp. 1-3.
Ayob et al.; "A Survey of Surface Mount Device Placement Machine Optimisation: Machine Classification"; Computer Science Technical Report No. NOTTCS-TR-2005-8; Sep. 2005; pp. 1-34.
"Aperture", Definition of Aperture by Merriam-Webster; located at http://www.merriam-webster.com/dictionary/aperture; printed by Examiner on Nov. 30, 2016; pp. 1-9; Merriam-Webster, Incorporated.
PCT International Preliminary Report on Patentability; International App. No. PCT/US2014/070645; dated Jun. 21, 2016; pp. 1-12.
Supplementary European Search Report, Pursuant to Rule 62 EPC; App. No. EP 14 87 2595; dated Jul. 3, 2017; pp. 1-16.
Supplementary European Search Report, Pursuant to Rule 62 EPC; App. No. EP 14 87 2874; dated Jul. 3, 2017; pp. 1-15.
European Patent Office, Supplementary European Search Report, Pursuant to Rule 62 EPC; App. No. EP 14891152; Jul 20, 2017 (received by our Agent on Jul. 26, 2017); pp. 1-4.

* cited by examiner

3/7

METHODS AND APPARATUS FOR CONTROLLING A SURFACE SCATTERING ANTENNA ARRAY

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)).

PRIORITY APPLICATIONS

The present application constitutes a continuation-in-part of U.S. patent application Ser. No. 14/226,213, entitled SURFACE SCATTERING ANTENNA ARRAY, naming JEFFREY A. BOWERS; DAVID JONES BRADY; TOM DRISCOLL; JOHN DESMOND HUNT; RODERICK A. HYDE; NATHAN INGLE LANDY; GUY SHLOMO LIPWORTH; ALEXANDER MROZACK; DAVID R. SMITH; AND CLARENCE T. TEGREENE as inventors, filed 26, Mar. 2014, which is currently co-pending or is an application of which a currently co-pending application is entitled to the benefit of the filing date, now U.S. Pat. No. 9,448,305.

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

SUMMARY

In one embodiment an apparatus comprises: circuitry configured to set a series of conditions corresponding to a surface scattering antenna array, each condition in the series of conditions including a frequency of a source, a configuration of a scattering antenna, and a configuration of a reflector antenna, and wherein the series of conditions corresponds to a series of beam patterns; circuitry configured to receive a series of signals corresponding to a detected amount of energy and produced by the surface scattering antenna array, the series of signals further corresponding to the series of conditions; and circuitry configured to produce an image of an object that is illuminated by the series of beam patterns using a compressive imaging algorithm based on the series of conditions and the series of signals.

In another embodiment a method comprises: setting a series of conditions corresponding to a surface scattering antenna array, each condition in the series of conditions including a frequency of a source, a configuration of a scattering antenna, and a configuration of a reflector antenna, and wherein the series of conditions corresponds to a series of beam patterns; receiving a series of signals corresponding to a detected amount of energy and produced by the surface scattering antenna array, the series of signals further corresponding to the series of conditions; and producing an image of an object that is illuminated by the series of beam patterns using a compressive imaging algorithm based on the series of conditions and the series of signals.

In one embodiment an apparatus for reconstructing an image with a surface scattering antenna array comprises: circuitry configured to receive a set of signals, each signal in the set of received signals being indicative of an amount of energy detected by a surface scattering antenna array, wherein each signal in the set of received signals corresponds to a set of conditions of the surface scattering antenna array; circuitry configured to compare the set of received signals to a set of reference signals, the set of reference signals corresponding to the set of conditions of the surface scattering antenna array; and circuitry configured to reconstruct an image based on comparing the set of received signals to the set of reference signals.

In one embodiment a method for reconstructing an image with a surface scattering antenna array comprises: receiving a set of signals, each signal in the set of received signals being indicative of an amount of energy detected by a surface scattering antenna array, wherein each signal in the set of received signals corresponds to a set of conditions of the surface scattering antenna array; comparing the set of received signals to a set of reference signals, the set of reference signals corresponding to the set of conditions of the surface scattering antenna array; and reconstructing an image based on comparing the set of received signals to the set of reference signals.

In one embodiment an apparatus comprises: circuitry configured to set a series of conditions corresponding to a scattering antenna and a reflector antenna, each condition in the series of conditions including an output frequency of the scattering antenna, a scattering element configuration of the scattering antenna, and a reflector element configuration of the reflector antenna, and wherein the series of conditions corresponds to a series of beam patterns created by the scattering antenna and the reflector antenna; and circuitry configured to receive a series of signals corresponding to an amount of energy detected by the scattering antenna.

In one embodiment a method comprises: setting a series of conditions corresponding to a scattering antenna and a reflector antenna, each condition in the series of conditions including an output frequency of the scattering antenna, a scattering element configuration of the scattering antenna, and a reflector element configuration of the reflector antenna, and wherein the series of conditions corresponds to a series of beam patterns created by the scattering antenna and the reflector antenna; and receiving a series of signals corresponding to an amount of energy detected by the scattering antenna.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
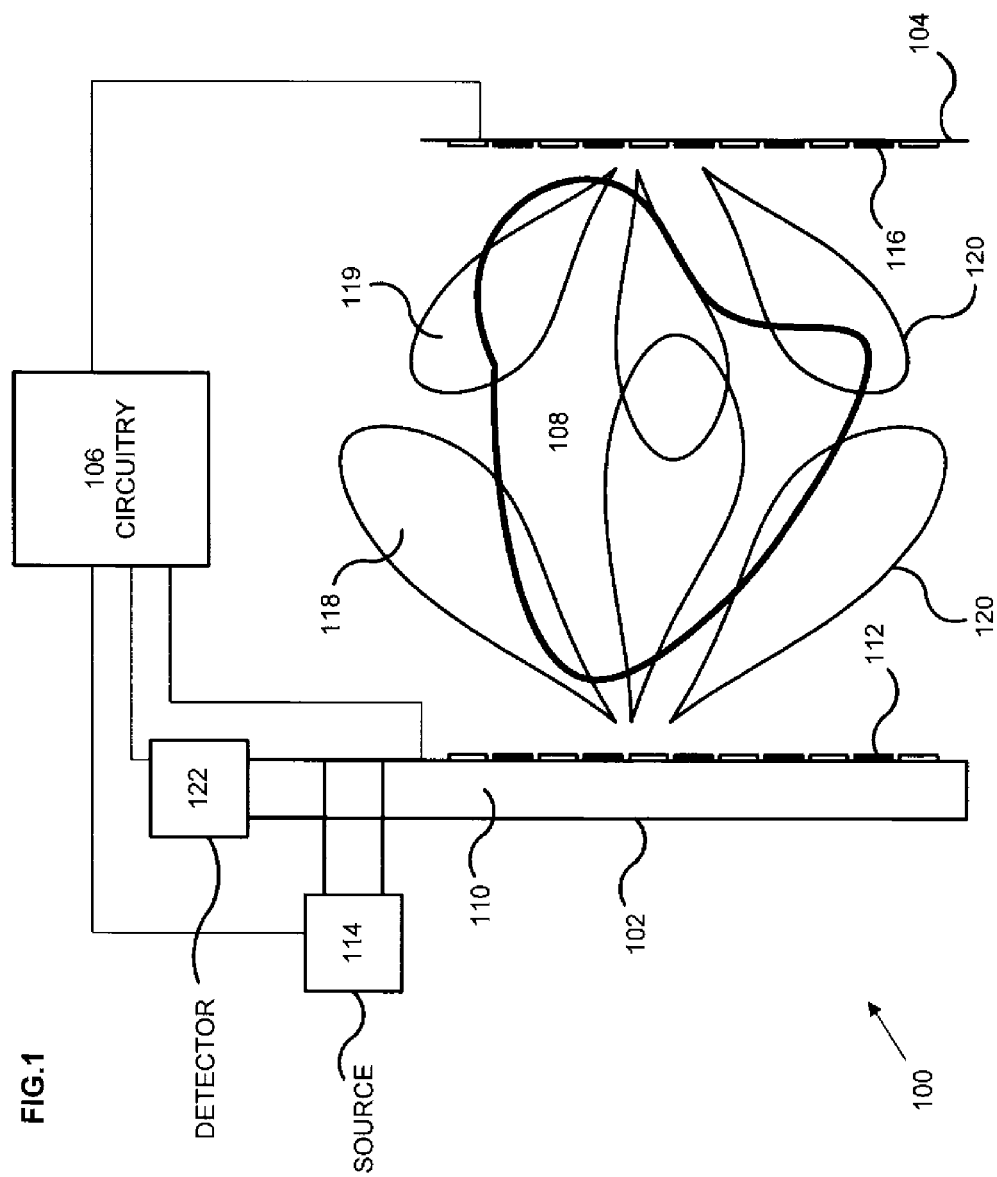
FIG. 1 is a schematic of a surface scattering antenna array.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 shows one embodiment of a system 100 that includes a scattering antenna 102, a reflector antenna 104, and circuitry 106 arranged to image an object 108. Scattering antennas (also called surface scattering antennas) were described in Bily et al., "Surface Scattering Antennas", U.S. Patent Application Publication No. 2012/0194399 (hereinafter, Bily1), which is incorporated herein by reference, and in Bily et al., "Surface Scattering Antenna Improvements", U.S. patent application Ser. No. 13/838,934, filed Mar. 15, 2013, now U.S. Pat. No. 9,385,435 (hereinafter, Bily2). Reflector antennas (also called surface scattering reflector antennas) were described in Bowers et al, "Surface Scattering Reflector Antenna", U.S. patent application Ser. No. 14/102,253, filed Dec. 10, 2013 (hereinafter, Bowers), which is incorporated herein by reference. Reflector antennas are further described in detail later in this specification. Compressive imaging systems that incorporate surface scattering antennas were described in Smith et al., "Metamaterial Devices and Methods of Using the Same", U.S. Patent Application Publication No. 2013/0335256 (hereinafter, Smith1), which is incorporated herein by reference, and in Smith et al., "Metamaterial Devices and Methods of Using the Same", P.C.T. Application Publication No. WO/2014/025425 (hereinafter, Smith2).

In the embodiment in FIG. 1, the scattering antenna 102 includes a waveguide 110 with scattering elements 112, where the scattering elements may include complementary metamaterial elements as described in Bily1 and in Bily2. The waveguide 110 of the scattering antenna 102 is configured to receive electromagnetic energy from a source 114, wherein the electromagnetic energy propagates through the waveguide and is radiated by the scattering elements 112 to produce the first radiation field 118.

A portion of the first radiation field 118 is then received by the reflector antenna 104 having scattering elements 116, which re-radiates a portion of the energy to produce the second radiation field 119. The first and second radiation fields 118, 119 combine to form a beam pattern 120 in the location of an object 108 to be imaged. The beam pattern 120 depends on many factors, including but not limited to: the frequency of the electromagnetic energy, the pattern of the scattering elements 112 in the scattering antenna 102, the pattern of the scattering elements 116 in the reflector antenna 104, and the physical locations of each of the scattering elements 112, 116 in the scattering antenna 102 and the reflector antenna 104, which may be determined by the relative positions and orientations of the scattering antenna 102 and the reflector antenna 104. As is described in Bily1, Bily2, and Bowers, the scattering elements 112, 116 may in some embodiments be adjustable such that the first and second radiation fields 118, 119 are adjustable, and therefore the beam pattern 120 is adjustable responsive to the adjustment(s) to the scattering elements 112, 116.

The system further comprises a detector 122 that is configured to receive electromagnetic energy, where in FIG. 1 the detector is operably connected to the scattering antenna 102 to receive energy from the beam pattern 120 via the scattering antenna 102. Although FIG. 1 shows the detector 122 as being integral to the scattering antenna 102, in other embodiments the detector 122 may be separate. For example, the detector 122 may include a dipole antenna, a horn antenna, or another type of detector placed in the location of the beam pattern 120.

As described above, the beam pattern 120 is variable according to a number of factors. The circuitry 106 is configured with a compressive imaging algorithm (compressive imaging systems that incorporate surface scattering antennas were described in Smith1) to produce an image of an object 108 by determining a signal from the detector 122 for a known set of beam patterns 120.

In some embodiments the waveguide 110 is configured to allow a discrete set of modes to propagate, wherein each mode in the discrete set of modes corresponds to a frequency. Each mode may then correspond to first and second radiation fields 118, 119.

In some embodiments the circuitry 106 may be operably connected to one or more elements of the system in order to change the beam pattern 120. For example, the beam pattern 120 may be varied by varying the frequency of the electromagnetic energy, and the source 114 may be operably connected to the circuitry 106 to receive a signal to vary the frequency of the electromagnetic energy produced by the source 114.

Further, the beam pattern 120 may be varied according to the configuration of the scattering elements 112 in the scattering antenna 102. This is explained in detail in Bily1. In such an embodiment, the circuitry 106 may be operably connected to the scattering antenna 102 to change the configuration of the scattering elements 102. Further, the beam pattern 120 may be varied according to the configuration of the scattering elements 116 in the reflector antenna 104. This is explained in detail in Bowers. In such an embodiment, the circuitry 106 may be operably connected to the reflector antenna 104 to change the configuration of the scattering elements 116. The configuration of the scattering elements 112, 116 in the scattering and/or reflector antennas 102, 104 may be configured to vary according to the frequency of the electromagnetic energy. In some embodiments the scattering elements may be resonant, they may be patterned on a dielectric that is highly dispersive, and/or the shape of the scattering antenna 102 and/or the reflector antenna 104 may by structured to produce frequency-dependent reflections that include speckle.

The scattering antenna 102 and the reflector antenna 104 each has a position and an orientation, and the relative position and orientation of each of these antennas with respect to the other can also change the beam pattern. In some embodiments the scattering antenna 102 and/or the reflector antenna 104 may be mounted on a moveable device such that the relative position and/or orientation of the antennas may be varied, and in such an embodiment the circuitry may be operably connected to control the position(s) and/or the orientation(s) of one or more of the antennas. Further, the beam pattern can be changed by changing more than one of the above described parameters. For example, the frequency of the electromagnetic energy and the configuration of the scattering elements in the scattering antenna 102 may be changed.

The frequency range of the electromagnetic energy may depend on the particular application, and may, for example, include RF frequencies and/or millimeter wave frequencies.

Figure 2:
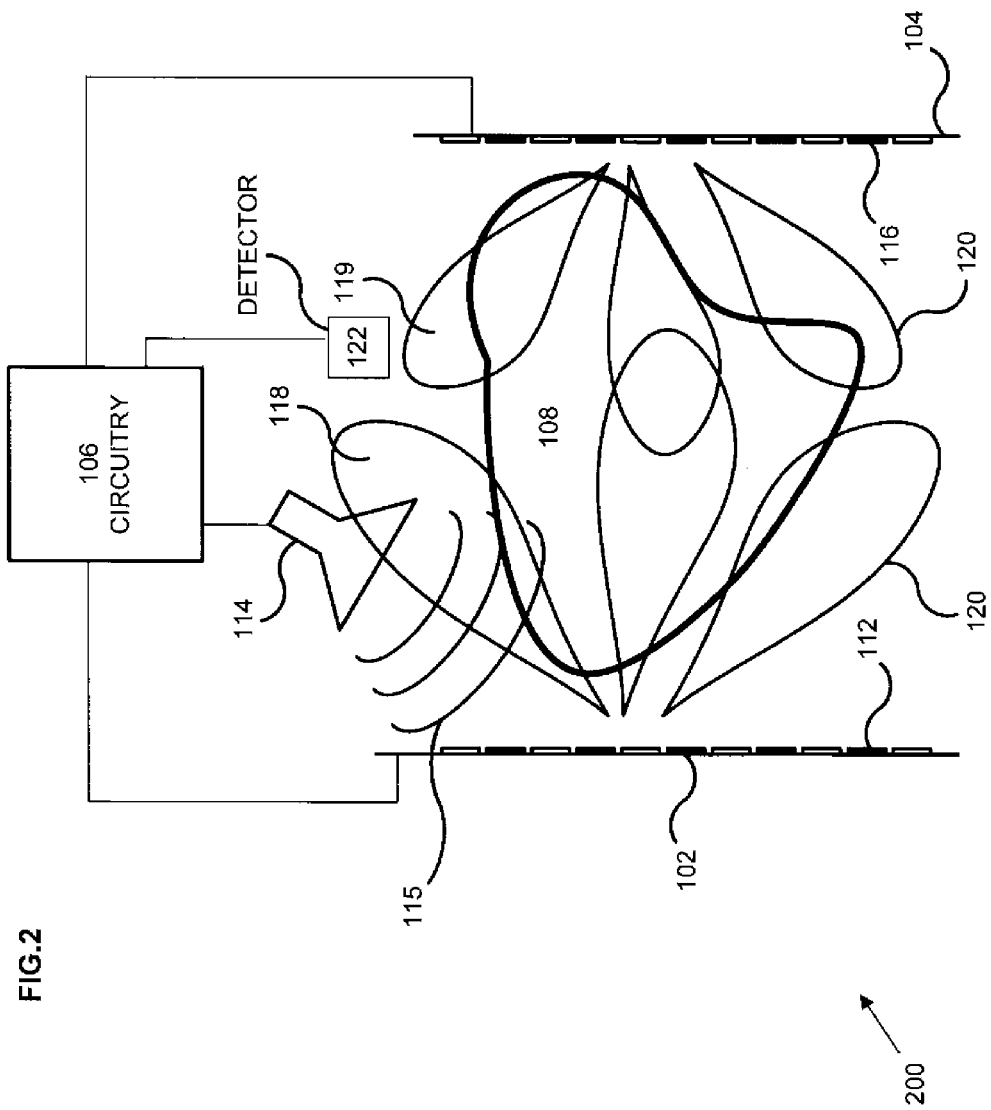
FIG. 2 is a schematic of a surface scattering antenna array.

In one embodiment, the scattering antenna 102 may be replaced by another reflector antenna 104, as shown in FIG. 2. In this embodiment, the source 114 is configured to produce electromagnetic energy that impinges on the reflector antenna 104 to produce the first radiation field and the detector 122 is any device that is configured to detect electromagnetic energy in the frequency range(s) produced by the source 114, and is placed in such a way that it can receive energy from the beam pattern 120.

Figure 3:
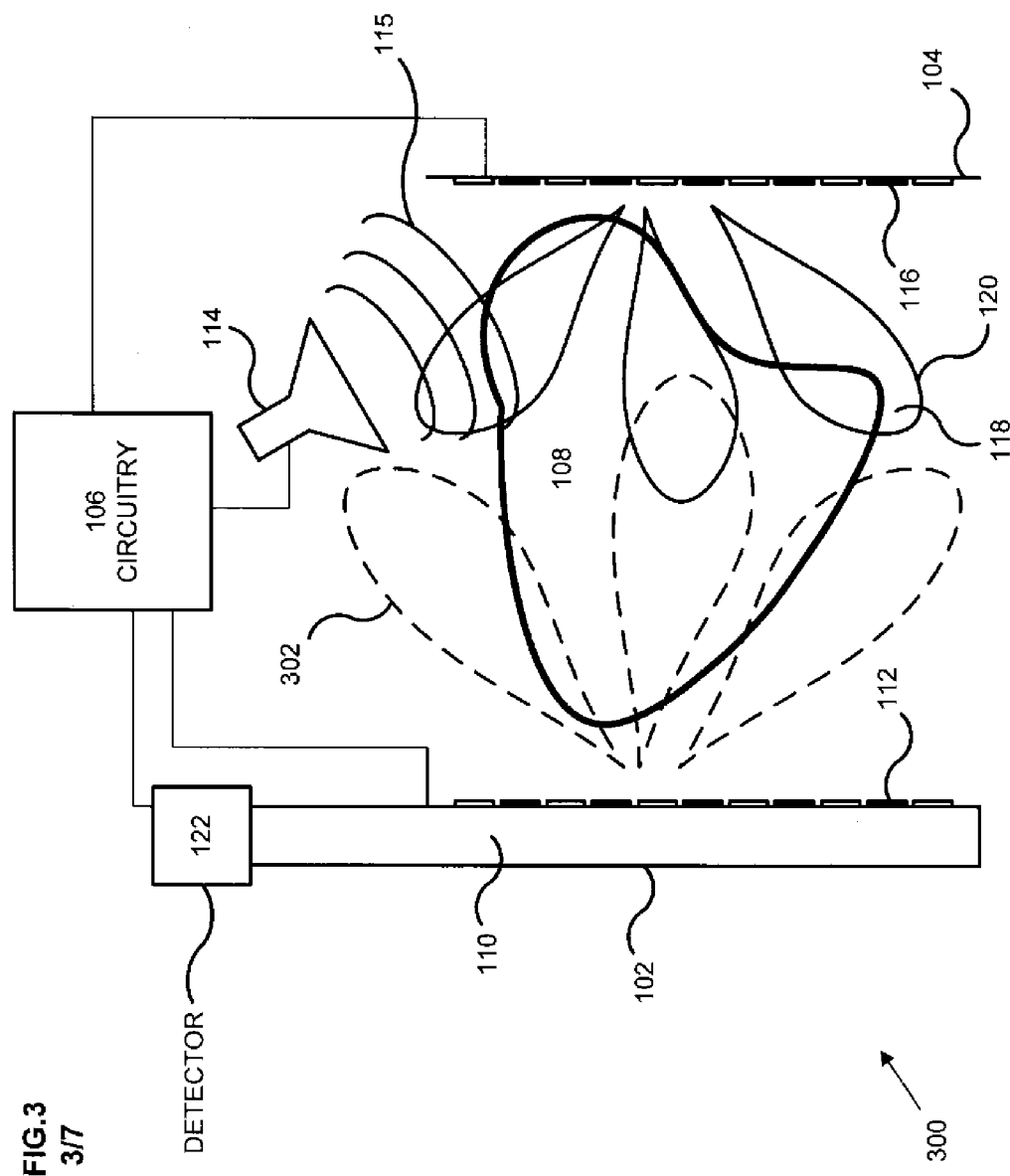
FIG. 3 is a schematic of a surface scattering antenna array.

FIG. 3 shows another embodiment of a system 300 that includes a scattering antenna 102, a reflector antenna 104, and circuitry 106 arranged to image an object 108. In the embodiment in FIG. 3, the source 114 is configured to produce electromagnetic energy 115 that impinges on the reflector antenna 104. The source 114 is shown as a horn antenna, however it may be a different type of source, such as a dipole antenna or other source. The reflector antenna 104 is responsive to reflect a portion of the incident electromagnetic energy to produce a first radiation field 118. The scattering antenna 102 is configured to receive at least a portion of the first radiation field 118, specifically, the portion that overlaps the measurement field pattern 302 of the scattering antenna 102. The detector 122 receives a signal that is a function of the first radiation field 118 produced by the reflector antenna 104, the distribution of the scattering elements 112 on the scattering antenna 102, and, where the scattering antenna 102 has a variable configuration, the signal received by the detector will also be a function of the state of the scattering elements 112.

Similar to what was described for FIG. 1, the apparatuses shown in FIGS. 2 and 3 may be configured with circuitry and may be controlled by the circuitry and have variability in ways similar to that of FIG. 1.

Although the embodiments in FIGS. 1-3 are shown with two antennas (i.e., scattering and/or reflector antennas 102, 104), some embodiments may include more than two antennas 102 and 104. For example, one embodiment may include a scattering antenna 102 and two or more reflector antennas 104, where the reflector antennas may be positioned to produce a selected beam pattern 120. Such an embodiment may be used, for example, in a room where the reflector antennas 104 are used to selectively illuminate different portions of the room. Further, although FIGS. 1-3 show the two antennas as facing one another, in other embodiments the antennas may have a different configuration, and further, where one or more antennas are mounted on a moveable device, the relative angle and/or positions of the antennas may be varied in time, thus varying the beam patterns created by the array.

There are many different permutations of the embodiments shown in FIGS. 1-3. For example, FIG. 1 shows a scattering antenna 102 producing the first radiation field 118, acting effectively as the source for the array. However, FIGS. 2 and 3 show a reflector antenna 104 producing the first radiation field 118. Thus, either a scattering antenna 102 or a reflector antenna 104 can be configured to produce the first radiation field 118. Further, any number of scattering antennas 102 and/or reflector antennas 104 may be configured together in an array. The scattering elements 112, 116 in these antennas may be configured to be adjustable or static. Further still, the position and/or orientation of the antennas in the array may be configured to be adjustable as a function of time. Thus, an antenna array can be configured in a multitude of different ways according to a particular configuration.

In one embodiment, an apparatus comprises: circuitry (such as circuitry 106 shown in FIGS. 1-3) configured to set a series of conditions corresponding to a surface scattering antenna array (such as the arrays shown in FIGS. 1-3 that show a combination of scattering antennas 102 and/or reflector antennas 104), each condition in the series of conditions including a frequency of a source 114, a configuration of a scattering antenna 102, and a configuration of a reflector antenna 104, and wherein the series of conditions corresponds to a series of beam patterns 120; circuitry configured to receive a series of signals corresponding to a detected amount of energy and produced by the surface scattering antenna array corresponding to the series of conditions; and circuitry configured to produce an image of an object 108 that is illuminated by the series of beam patterns 120 using a compressive imaging algorithm based on the series of conditions and the series of signals.

In one embodiment the series of beam patterns 120 corresponds to a series of pre-determined spatial field distributions, and wherein the compressive imaging algorithm is further configured to produce an image of an object 108 based on the series of pre-determined spatial distributions. For example, the pre-determined spatial field distributions may be based on calculated or measured field distributions, and the compressive imaging algorithm may be configured to compare the received series of signals to a reference series of signals that would correspond to the pre-determined spatial field distributions.

In some embodiments the at least one signal in the series of signals corresponds to a detected amount of energy at a location on the reflector antenna 104, the scattering antenna 102, and/or at a location that is within a region defined by at least one beam pattern 120 in the series of beam patterns. Any number of detectors 122 may be arranged relative to the configurations shown in FIGS. 1-3, and feedback from these detectors may be used to determine further conditions of the surface scattering antenna array, such as antenna location, orientation, configuration, source frequency, source and detector location, and/or other parameters of the array. In one embodiment the circuitry configured to set a series of conditions is further configured to select at least one condition in the series of conditions according to at least one signal in the series of signals.

In one embodiment the circuitry configured to set the series of conditions is configured to set the configuration of the scattering antenna 102 by adjusting at least one scattering element 112 in the scattering antenna, for example by adjusting at least one of a voltage, a current, a field, a mechanical input, and an optical input applied to the at least one scattering element 112. The circuitry configured to set the series of conditions may also be configured to set the configuration of the scattering antenna 102 by moving and/or rotating the scattering antenna 102.

In one embodiment the circuitry configured to set the series of conditions is configured to set the configuration of the reflector antenna 104 by adjusting at least one scattering element 116 in the reflector antenna 104, for example by adjusting at least one of a voltage, a current, a field, a mechanical input, and an optical input applied to the at least one scattering element 116. The circuitry configured to set the series of conditions may also be configured to set the configuration of the reflector antenna 104 by moving and/or rotating the reflector antenna 104.

As discussed previously with respect to FIGS. 1-3, the frequency of the source may include mmW frequencies, RF frequencies, and/or other frequencies that may be functional with the apparatuses shown and described with respect to FIGS. 1-3.

In one embodiment the circuitry configured to set the series of conditions is further configured to select the configuration of the scattering antenna 102 and/or the reflector antenna 104 from at least two pre-determined configurations of the scattering antenna 102 and/or the reflector antenna 104.

In one embodiment, an apparatus (as shown in FIGS. 1-3) for reconstructing an image with a surface scattering antenna array (such as the arrays formed by the scattering antennas 102 and/or the reflector antennas 104 shown in FIGS. 1-3) comprises: circuitry (such as the circuitry 106) configured to receive a set of signals, each signal in the set of received signals being indicative of an amount of energy detected by a surface scattering antenna array, wherein each signal in the set of received signals corresponds to a set of conditions of the surface scattering antenna array; circuitry configured to compare the set of received signals to a set of reference signals, the set of reference signals corresponding to the set of conditions of the surface scattering antenna array; and circuitry configured to reconstruct an image based on comparing the set of received signals to the set of reference signals.

In one embodiment the surface scattering antenna array includes a metamaterial scattering antenna (such as the scattering antenna 102) and a metamaterial reflector antenna (such as the reflector antenna 104).

In one embodiment the circuitry configured to compare the set of received signals to the set of reference signals includes circuitry configured to access a database of pre-recorded signals corresponding to the set of conditions, where in some embodiments the apparatus may further comprise circuitry configured to perform a set of measurements to create the database of pre-recorded signals.

In one embodiment the circuitry configured to compare the set of received signals to the set of reference signals includes circuitry configured to access a database of calculated signals corresponding to the set of conditions, where in some embodiments the apparatus may further comprise circuitry configured to calculate a set of signals corresponding to the set of conditions to produce the database of calculated signals. The set of conditions includes those conditions previously described herein with respect to the series of conditions.

In one embodiment the circuitry configured to reconstruct an image based on comparing the set of received signals to the set of reference signals includes circuitry configured to use a compressive imaging algorithm to reconstruct the image.

In one embodiment the apparatus further comprises circuitry configured to send a set of signals to at least one of a scattering antenna, a reflector antenna, a source, and a detector to produce the set of conditions. In such an embodiment the apparatus may further comprise circuitry configured to send at least one signal in the set of sent signals responsive to at least one received signal in the set of received signals.

In one embodiment an apparatus comprises: circuitry configured to set a series of conditions corresponding to a scattering antenna and a reflector antenna, each condition in the series of conditions including an output frequency of the scattering antenna, a scattering element configuration of the scattering antenna, and a reflector element configuration of the reflector antenna, and wherein the series of conditions corresponds to a series of beam patterns created by the scattering antenna and the reflector antenna; and circuitry configured to receive a series of signals corresponding to an amount of energy detected by the scattering antenna. The apparatus may further comprise circuitry configured to produce an image of an object that is illuminated by the series of beam patterns using a compressive imaging algorithm.

Figure 4:
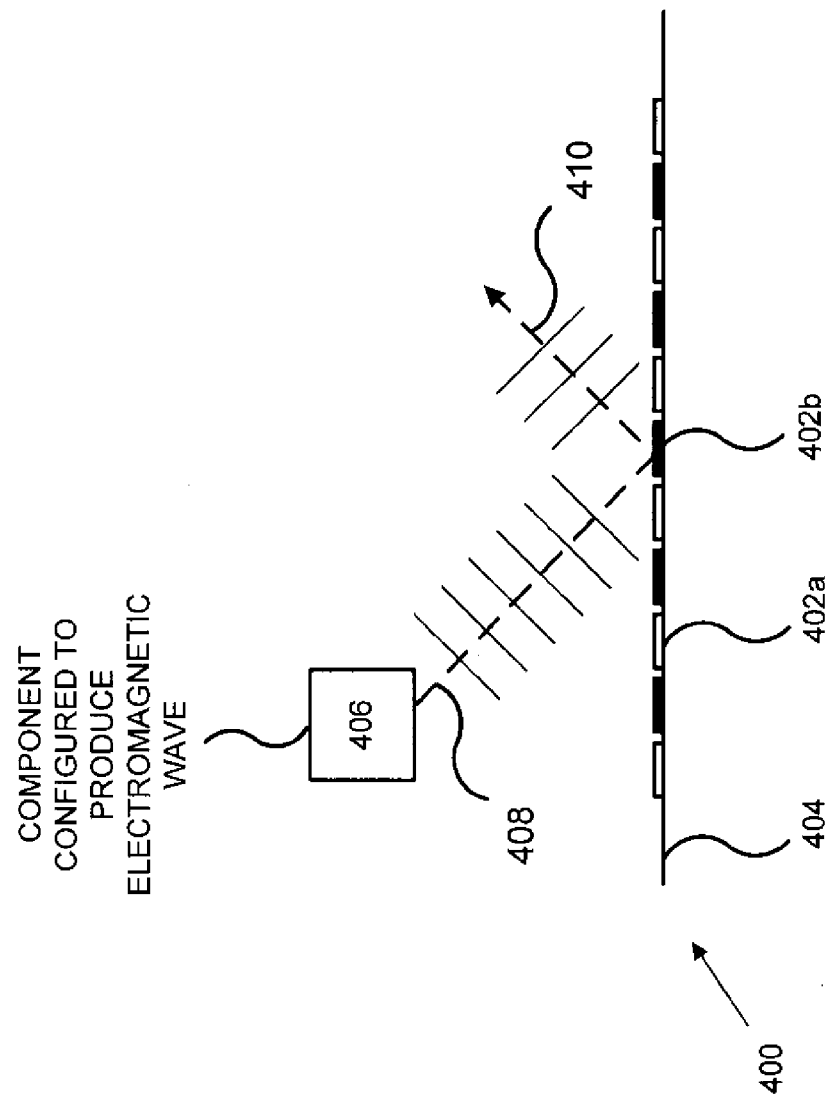
FIG. 4 is a schematic of a surface scattering reflector antenna.

A schematic illustration of a surface scattering reflector antenna 400 is depicted in FIG. 4. The surface scattering reflector antenna 400 includes a plurality of scattering elements 402a, 402b that are distributed along a substrate 404. The substrate 404 may be a printed circuit board (such as FR4 or another dielectric with a surface layer of metal such as copper or another conductor), or a different type of structure, which may be a single layer or a multi-layer structure. The broken line 408 is a symbolic depiction of an electromagnetic wave incident on the surface scattering reflector antenna 400, and this symbolic depiction is not intended to indicate a collimated beam or any other limitation of the electromagnetic wave. The scattering elements 402a, 402b may include metamaterial elements and/or other sub-wavelength elements that are embedded within or positioned on a surface of the substrate 404.

The surface scattering reflector antenna 400 may also include a component 406 configured to produce the incident electromagnetic wave 408. The component 406 may be an antenna such as a dipole and/or monopole antenna.

When illuminated with the component 406, the surface scattering reflector antenna 400 produces beam patterns dependent on the pattern formed by the scattering elements 402a, 402b and the frequency and/or wave vector of the radiation. The scattering elements 402a, 402b each have an adjustable individual electromagnetic response that is dynamically adjustable such that the reflected beam pattern is adjustable responsive to changes in the electromagnetic response of the elements 402a, 402b. In some embodiments the scattering elements 402a, 402b include metamaterial elements that are analogous to the adjustable complementary metamaterial elements described in Bily1, previously cited.

The scattering elements 402a, 402b are adjustable scattering elements having electromagnetic properties that are adjustable in response to one or more external inputs. Various embodiments of adjustable scattering elements are described, for example, in D. R. Smith et al., "Metamaterials for surfaces and waveguides", U.S. Patent Application Publication No. 2010/0156573, which is incorporated herein by reference, and in Bily1, and further in this disclosure. Adjustable scattering elements can include elements that are adjustable in response to voltage inputs (e.g. bias voltages for active elements (such as varactors, transistors, diodes) or for elements that incorporate tunable dielectric materials (such as ferroelectrics)), current inputs (e.g. direct injection of charge carriers into active elements), optical inputs (e.g. illumination of a photoactive material), field inputs (e.g. magnetic fields for elements that include nonlinear magnetic materials), mechanical inputs (e.g. MEMS, actuators, hydraulics), etc. In the schematic example of FIG. 4, scattering elements 402a, 402b that have been adjusted to a first state having first electromagnetic properties are depicted as the first elements 402a, while scattering elements that have been adjusted to a second state having second electromagnetic properties are depicted as the second elements 402b. The depiction of scattering elements having first and second states corresponding to first and second electromagnetic properties is not intended to be limiting: embodiments may provide scattering elements that are discretely adjustable to select from a discrete plurality of states corresponding to a discrete plurality of different electromagnetic properties, or continuously adjustable to select from a continuum of states corresponding to a continuum of different electromagnetic properties. Moreover, the particular pattern of adjustment that is depicted in FIG. 4 (i.e. the alternating arrangement of elements 402a and 402b) is only an exemplary configuration and is not intended to be limiting.

In the example of FIG. 4, the scattering elements 402a, 402b have first and second couplings to the incident electromagnetic wave 408 that are functions of the first and second properties, respectively. For example, the first and second couplings may be first and second polarizabilities of the scattering elements at the frequency or frequency band of the incoming wave 408. In one approach the first coupling is a substantially non-zero coupling whereas the second coupling is a substantially zero coupling. In another approach both couplings are substantially non-zero but the first coupling is substantially greater than (or less than) the second coupling. On account of the first and second couplings, the first and second scattering elements 402a, 402b are responsive to the incoming electromagnetic wave 408 to produce a plurality of scattered electromagnetic waves having amplitudes that are functions of (e.g. are proportional to) the respective first and second couplings. A superposition of the scattered electromagnetic waves, along with the portion of the incoming electromagnetic wave 408 that is reflected by the substrate 404, comprises an electromagnetic wave that is depicted, in this example, as a plane wave 410 that radiates from the surface scattering reflector antenna 400.

The emergence of the plane wave 410 may be understood by regarding the particular pattern of adjustment of the scattering elements (e.g. an alternating arrangement of the first and second scattering elements in FIG. 4) as a pattern that scatters the incoming electromagnetic wave 408 to produce the plane wave 410. Because this pattern is adjustable, some embodiments of the surface scattering elements may be selected according to principles of holography. Suppose, for example, that the incoming wave 408 may be represented by a complex scalar input wave $\Psi_{in}$, and it is desired that the surface scattering reflector antenna produce an output wave that may be represented by another complex scalar wave $\Psi_{out}$. Then a pattern of adjustment of the scattering elements may be selected that corresponds to an interference pattern of the input and output waves along the antenna. For example, the scattering elements may be adjusted to provide couplings to the guided wave or surface wave that are functions of (e.g. are proportional to, or step-functions of) an interference term given by $\text{Re}[\Psi_{out}\Psi_{in}^*]$. In this way, embodiments of the surface scattering reflector antenna 400 may be adjusted to provide arbitrary antenna radiation patterns by identifying an output wave $\Psi_{out}$ corresponding to a selected beam pattern, and then adjusting the scattering elements accordingly as above. Embodiments of the surface scattering antenna may therefore be adjusted to provide, for example, a selected beam direction (e.g. beam steering), a selected beam width or shape (e.g. a fan or pencil beam having a broad or narrow beamwidth), a selected arrangement of nulls (e.g. null steering), a selected arrangement of multiple beams, a selected polarization state (e.g. linear, circular, or elliptical polarization), a selected overall phase or distribution of phases, or any combination thereof. Alternatively or additionally, embodiments of the surface scattering reflector antenna 400 may be adjusted to provide a selected near-field radiation profile, e.g. to provide near-field focusing and/or near-field nulls.

Because the spatial resolution of the interference pattern is limited by the spatial resolution of the scattering elements, the scattering elements may be arranged along the substrate 404 with inter-element spacings that are much less than a free-space wavelength corresponding to an operating frequency of the device (for example, less than one-third or one-fourth of this free-space wavelength). In some approaches, the operating frequency is a microwave frequency, selected from frequency bands such as Ka, Ku, and Q, corresponding to centimeter-scale free-space wavelengths. This length scale admits the fabrication of scattering elements using conventional printed circuit board technologies, as described below.

In some approaches, the surface scattering reflector antenna 400 includes a substantially one-dimensional arrangement of scattering elements, and the pattern of adjustment of this one-dimensional arrangement may provide, for example, a selected antenna radiation profile as a function of zenith angle (i.e. relative to a zenith direction that is parallel to the one-dimensional wave-propagating structure). In other approaches, the surface scattering reflector antenna includes a substantially two-dimensional arrangement of scattering elements, and the pattern of adjustment of this two-dimensional arrangement may provide, for example, a selected antenna radiation profile as a function of both zenith and azimuth angles (i.e. relative to a zenith direction that is perpendicular to the substrate 404).

In some approaches, the substrate 404 is a modular substrate 404 and a plurality of modular substrates may be assembled to compose a modular surface scattering antenna. For example, a plurality of substrates 404 may be assembled to produce a larger aperture having a larger number of scattering elements; and/or the plurality of substrates may be assembled as a three-dimensional structure (e.g. forming an A-frame structure, a pyramidal structure, a wine crate structure, or other multi-faceted structure).

In some applications of the modular approach, the number of modules to be assembled may be selected to achieve an aperture size providing a desired telecommunications data capacity and/or quality of service, and or a three-dimensional arrangement of the modules may be selected to reduce potential scan loss. Thus, for example, the modular assembly could comprise several modules mounted at various locations/orientations flush to the surface of a vehicle such as an aircraft, spacecraft, watercraft, ground vehicle, etc. The modules need not be contiguous. In these and other approaches, the substrate may have a substantially non-linear or substantially non-planar shape whereby to conform to a particular geometry, therefore providing a conformal surface scattering reflector antenna (conforming, for example, to the curved surface of a vehicle).

More generally, a surface scattering reflector antenna is a reconfigurable antenna that may be reconfigured by selecting a pattern of adjustment of the scattering elements so that a corresponding scattering of the incident electromagnetic wave 408 produces a desired output wave. Thus, embodiments of the surface scattering reflector antenna may provide a reconfigurable antenna that is adjustable to produce a desired output wave by adjusting a plurality of couplings.

In some approaches, the reconfigurable antenna is adjustable to provide a desired polarization state of the output wave. Suppose, for example that first and second subsets of the scattering elements provide electric field patterns that are substantially linearly polarized and substantially orthogonal (for example, the first and second subjects may be scattering elements that are perpendicularly oriented on a surface of the substrate 404). Then the antenna output wave EOM may be expressed as a sum of two linearly polarized components.

Accordingly, the polarization of the output wave may be controlled by adjusting the plurality of couplings, e.g. to provide an output wave with any desired polarization (e.g. linear, circular, or elliptical).

Figure 5:
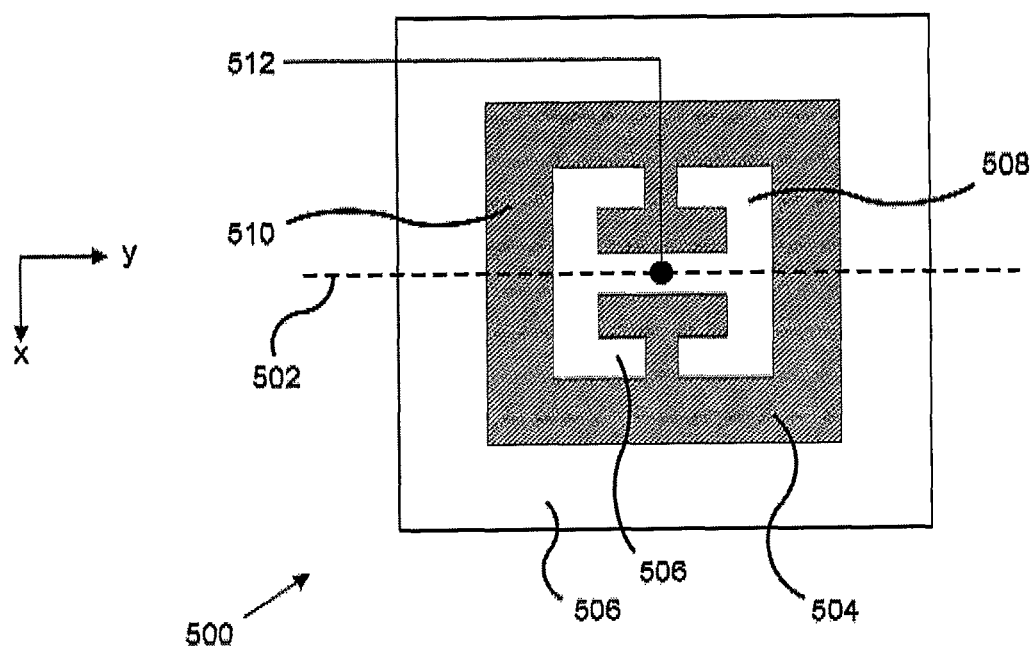
FIG. 5 is a schematic of a cross-section of a unit cell of a surface scattering reflector antenna.
Figure 6:
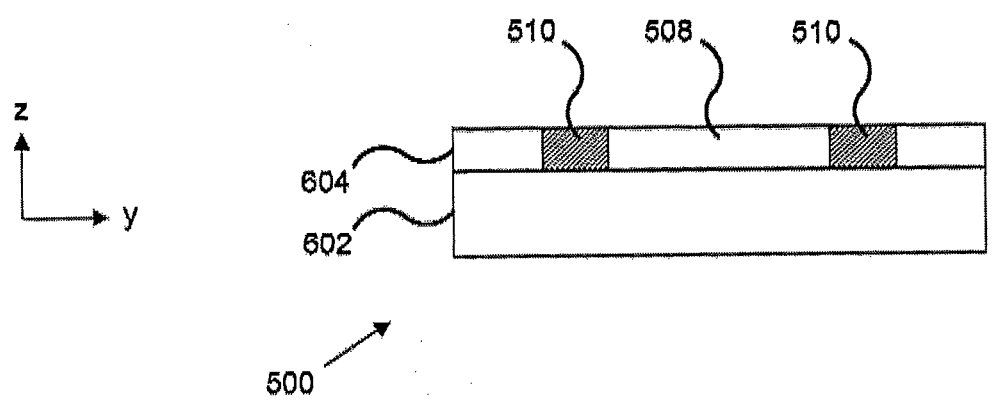
FIG. 6 is a schematic of a side view of a unit cell of a surface scattering reflector antenna.

FIGS. 5 and 6 show a top (FIG. 5) and cross sectional view (FIG. 6; cross section corresponds to dashed line 502 in FIG. 5) of one exemplary embodiment of a unit cell 500 of a scattering element (such as 402a and/or 402b) of the surface scattering reflector antenna 400. In this embodiment the substrate 404 includes a dielectric layer 602 and a conductor layer 604, where the scattering element (402a, 402b) is formed by removing a portion of the conductor layer to form a complementary metamaterial element 504, in this case a complementary electric LC (CELC) metamaterial element that is defined by a shaped aperture 506 that has been etched or patterned in the conductor layer 604 (e.g. by a PCB process).

A CELC element such as that depicted in FIGS. 2 and 3 is substantially responsive to a magnetic field that is applied parallel to the plane of the CELC element and perpendicular to the CELC gap complement, i.e., in the x direction for the orientation of FIG. 5 (cf. T. H. Hand et al., "Characterization of complementary electric field coupled resonant surfaces," Applied Physics Letters, 93, 212504 (2008), herein incorporated by reference). Therefore, a magnetic field component of an incident electromagnetic wave can induce a magnetic excitation of the element 504 that may be substantially characterized as a magnetic dipole excitation oriented in the x direction, thus producing a scattered electromagnetic wave that is substantially a magnetic dipole radiation field.

Noting that the shaped aperture 506 also defines a conductor island 508 which is electrically disconnected from outer regions of the conductor layer 604, in some approaches the scattering element can be made adjustable by providing an adjustable material within and/or proximate to the shaped aperture 506 and subsequently applying a bias voltage between the conductor island 508 and the outer regions of the conductor layer 604. For example, as shown in FIG. 5, the unit cell may include liquid crystal 510 in the region between the conductor island 508 and the outer regions of the conductor layer 604. Liquid crystals have a permittivity that is a function of orientation of the molecules comprising the liquid crystal; and that orientation may be controlled by applying a bias voltage (equivalently, a bias electric field) across the liquid crystal; accordingly, liquid crystals can provide a voltage-tunable permittivity for adjustment of the electromagnetic properties of the scattering element. Methods and apparatus for containing the liquid crystal are described in Bily1.

For a nematic phase liquid crystal, wherein the molecular orientation may be characterized by a director field, the material may provide a larger permittivity $\epsilon_1$ for an electric field component that is parallel to the director and a smaller permittivity $\epsilon_2$ for an electric field component that is perpendicular to the director. Applying a bias voltage introduces bias electric field lines that span the shaped aperture and the director tends to align parallel to these electric field lines (with the degree of alignment increasing with bias voltage). Because these bias electric field lines are substantially parallel to the electric field lines that are produced during a scattering excitation of the scattering element, the permittivity that is seen by the biased scattering element correspondingly tend towards $\epsilon_1$ (i.e. with increasing bias voltage). On the other hand, the permittivity that is seen by the unbiased scattering element may depend on the unbiased configuration of the liquid crystal. When the unbiased liquid crystal is maximally disordered (i.e. with randomly oriented micro-domains), the unbiased scattering element may see an averaged permittivity $\epsilon_{ave} \sim (\epsilon_1 + \epsilon_2)/2$. When the unbiased liquid crystal is maximally aligned perpendicular to the bias electric field lines (i.e. prior to the application of the bias electric field), the unbiased scattering element may see a permittivity as small as $\epsilon_2$. Accordingly, for embodiments where it is desired to achieve a greater range of tuning of the permittivity that is seen by the scattering element, the unit cell 500 may include positionally-dependent alignment layer(s) disposed at the top and/or bottom surface of the liquid crystal layer 510, the positionally-dependent alignment layer(s) being configured to align the liquid crystal director in a direction substantially perpendicular to the bias electric field lines that correspond to an applied bias voltage. The alignment layer(s) may include, for example, polyimide layer(s) that are rubbed or otherwise patterned (e.g. by machining or photolithography) to introduce microscopic grooves that run parallel to the channels of the shaped aperture 506.

Alternatively or additionally, the unit cell may provide a first biasing that aligns the liquid crystal substantially perpendicular to the channels of the shaped aperture 506 (e.g. by introducing a bias voltage between the conductor island 508 and the outer regions of the conductor layer 604), and a second biasing that aligns the liquid crystal substantially parallel to the channels of the shaped aperture 506 (e.g. by introducing electrodes positioned above the outer regions of the conductor layer 604 at the four corners of the unit cell, and applying opposite voltages to the electrodes at adjacent corners); tuning of the scattering element may then be accomplished by, for example, alternating between the first biasing and the second biasing, or adjusting the relative strengths of the first and second biasings. Examples of types of liquid crystals that may be used are described in Bily1.

Turning now to approaches for providing a bias voltage between the conductor island 508 and the outer regions of the conductor layer 604, it is first noted that the outer regions of the conductor layer 604 extends contiguously from one unit cell to the next, so an electrical connection to the outer regions of the conductor layer 604 of every unit cell may be made by a single connection to this contiguous conductor. As for the conductor island 508, FIG. 5 shows an example of how a bias voltage line 512 may be attached to the conductor island. In this example, the bias voltage line 512 is attached at the center of the conductor island and extends away from the conductor island along a plane of symmetry of the scattering element; by virtue of this positioning along a plane of symmetry, electric field lines that are experienced by the bias voltage line during a scattering excitation of the scattering element are substantially perpendicular to the bias voltage line that could disrupt or alter the scattering properties of the scattering element. The bias voltage line 512 may be installed in the unit cell by, for example, depositing an insulating layer (e.g. polyamide), etching the insulating layer at the center of the conductor island, and then using a lift-off process to pattern a conducting film (e.g. a Cr/Au bilayer) that defines the bias voltage line 512.

The cross sectional shape of the complementary metamaterial element 504 shown in FIG. 5 is just one exemplary embodiment, and other shapes, orientations, and/or other characteristics may be selected according to a particular embodiment. For example, Bily1 describes a number of CELC's that may be incorporated in the device as described above, as well as ways in which arrays of CELC's may be addressed.

Figure 7:
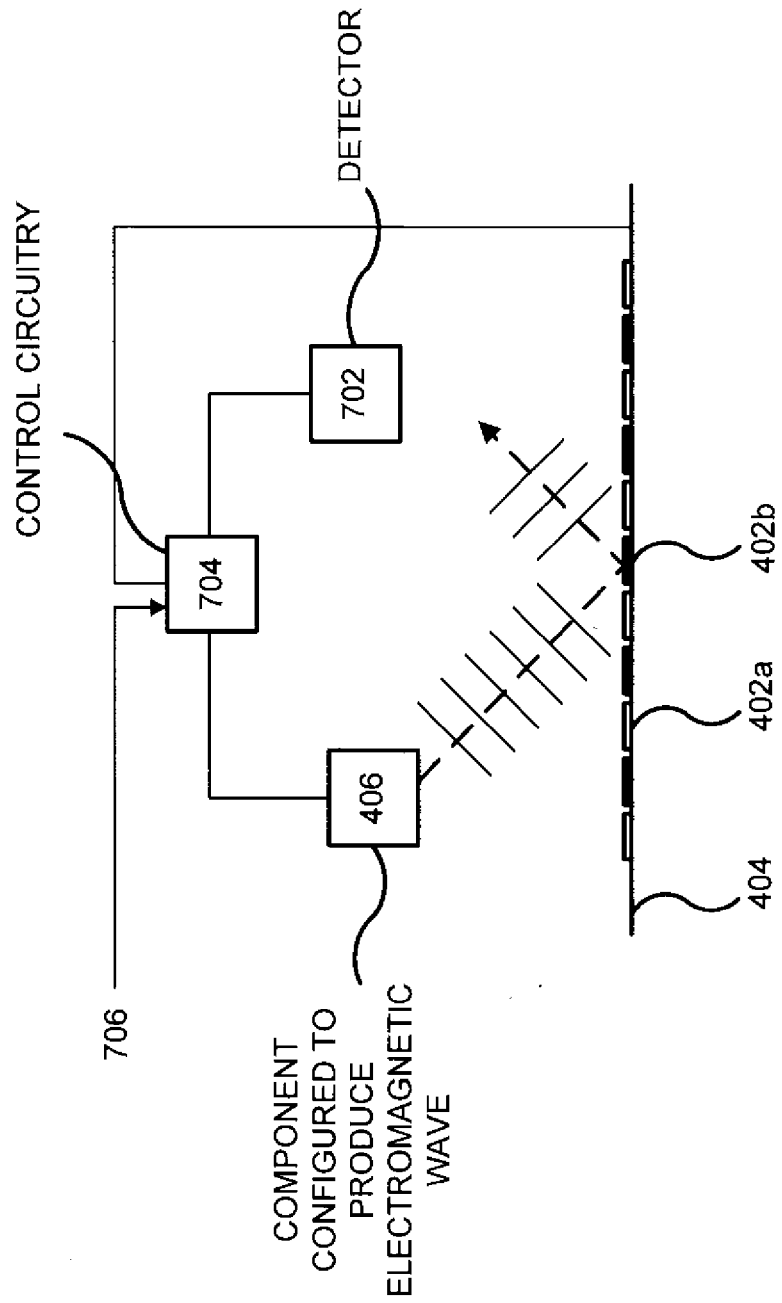
FIG. 7 is a schematic of a system including a surface scattering reflector antenna.

FIG. 7 shows a system incorporating the surface scattering reflector antenna of FIG. 4 with a separate detector 702 and control circuitry 704. In this embodiment the detector 702 and the component 406 that produces the incident wave are housed in separate units, however as mentioned previously in some embodiments they may be housed together in the same unit. The control circuitry 704 is operably connected to both the detector 702 and the component 406, and may transmit and/or receive signal(s) to/from these units. Although the detector 702 and the component 406 are shown as exemplary embodiments of elements that are operably connected to the control circuitry 704, in other embodiments the system may include other devices (for example, power supplies, additional detectors configured to detect the radiation pattern produced by the antenna, detectors configured to monitor conditions of the antenna, or a different device that may be added according to a particular embodiment) that may also be operably connected to the control circuitry 704. In some embodiments the control circuitry 704 is receptive to a signal 406, where the signal 406 may be a user input or other outside input. The control circuitry 704 may also be operably connected to control the surface scattering reflector antenna 400 to adjust the configuration of the antenna in ways as previously described herein.

In some approaches the control circuitry 704 includes circuitry configured to provide control inputs that correspond to a selected or desired radiation pattern. For example, the control circuitry 704 may store a set of configurations of the antenna, e.g. as a lookup table that maps a set of desired antenna radiation patterns (corresponding to various beam directions, beam widths, polarization states, etc. as described previously herein) to a corresponding set of values for the control input(s). This lookup table may be previously computed, e.g. by performing full-wave simulations of the antenna for a range of values of the control input(s) or by placing the antenna in a test environment and measuring the antenna radiation patterns corresponding to a range of values of the control input(s). In some approaches control circuitry may be configured to use this lookup table to calculate the control input(s) according to a regression analysis; for example, by interpolating values for the control input(s) between two antenna radiation patterns that are stored in the lookup table (e.g. to allow continuous beam steering when the lookup table only includes discrete increments of a beam steering angle). The control circuitry 704 may alternatively be configured to dynamically calculate the control input(s) corresponding to a selected or desired antenna radiation pattern, e.g. by, for example, computing a holographic pattern (as previously described herein). Further, the control circuitry 704 may be configured with one or more feedback loops configured to adjust parameters until a selected radiation pattern is achieved.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

All of the above U.S. patents, U.S. patent application publications, U.S. patent applications, foreign patents, foreign patent applications and non-patent publications referred to in this specification and/or listed in any Application Data Sheet are incorporated herein by reference, to the extent not inconsistent herewith.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus comprising:
   a surface scattering array that includes at least two antennas, where each antenna is either a surface scattering waveguide antenna or a surface scattering reflector antenna;
   circuitry configured to set a series of conditions corresponding to the surface scattering antenna array, each condition in the series of conditions including a frequency of a source, a configuration of the waveguide antenna, and a configuration of the reflector antenna, and wherein the series of conditions corresponds to a series of beam patterns;
   circuitry configured to receive a series of signals corresponding to a detected amount of energy and produced by the surface scattering antenna array, the series of signals further corresponding to the series of conditions; and
   circuitry configured to produce an image of an object that is illuminated by the series of beam patterns using a compressive imaging algorithm based on the series of conditions and the series of signals.

2. The apparatus of claim 1 wherein the series of beam patterns corresponds to a series of pre-determined spatial field distributions, and wherein the compressive imaging algorithm is further configured to produce an image of an object based on the series of pre-determined spatial distributions.

3. The apparatus of claim 2 wherein the at least one signal in the series of signals corresponds to a detected amount of energy at a location on the reflector antenna.

4. The apparatus of claim 2 wherein the at least one signal in the series of signals corresponds to a detected amount of energy at a location on the scattering antenna.

5. The apparatus of claim 2 wherein the at least one signal in the series of signals corresponds to a detected amount of energy at a location that is within a region defined by at least one beam pattern in the series of beam patterns.

6. The apparatus of claim 1 wherein the circuitry configured to set a series of conditions is further configured to select at least one condition in the series of conditions according to at least one signal in the series of signals.

7. The apparatus of claim 1 wherein the circuitry configured to set the series of conditions is configured to set the configuration of the scattering antenna by adjusting at least one scattering element in the scattering antenna.

8. The apparatus of claim 7 wherein the circuitry configured to set the configuration of the scattering antenna by adjusting at least one scattering element in the scattering antenna is further configured to adjust at least one of a voltage, a current, a field, a mechanical input, and an optical input applied to the at least one scattering element.

9. The apparatus of claim 1 wherein the circuitry configured to set the series of conditions is configured to set the configuration of the scattering antenna by moving the scattering antenna.

10. The apparatus of claim 1 wherein the circuitry configured to set the series of conditions is configured to set the configuration of the scattering antenna by rotating the scattering antenna.

11. The apparatus of claim 1 wherein the circuitry configured to set the series of conditions is configured to set the configuration of the reflector antenna by adjusting at least one scattering element in the reflector antenna.

12. The apparatus of claim 11 wherein the circuitry configured to set the configuration of the reflector antenna by adjusting at least one scattering element in the reflector antenna is further configured to adjust at least one of a voltage, a current, a field, a mechanical input, and an optical input applied to the at least one scattering element.

13. The apparatus of claim 1 wherein the circuitry configured to set the series of conditions is configured to set the configuration of the reflector antenna by moving the reflector antenna.

14. The apparatus of claim 1 wherein the circuitry configured to set the series of conditions is configured to set the configuration of the reflector antenna by rotating the reflector antenna.

15. The apparatus of claim 1 wherein the frequency of the source includes millimeter-wave frequencies.

16. The apparatus of claim 1 wherein the frequency of the source includes RF frequencies.

17. The apparatus of claim 1 wherein the circuitry configured to set the series of conditions is further configured to select the configuration of the scattering antenna from at least two pre-determined configurations of the scattering antenna.

18. The apparatus of claim 1 wherein the circuitry configured to set the series of conditions is further configured to select the configuration of the reflector antenna from at least two pre-determined configurations of the reflector antenna.

19. An apparatus for reconstructing an image, comprising:
a surface scattering array that includes at least two antennas, where each antenna is either a surface scattering waveguide antenna or a surface scattering reflector antenna;
circuitry configured to receive a set of signals, each signal in the set of received signals being indicative of an amount of energy detected by a surface scattering antenna array, wherein each signal in the set of received signals corresponds to a set of conditions of the surface scattering antenna array;
circuitry configured to compare the set of received signals to a set of reference signals, the set of reference signals corresponding to the set of conditions of the surface scattering antenna array; and
circuitry configured to reconstruct an image based on comparing the set of received signals to the set of reference signals.

20. The apparatus of claim 19 wherein the surface scattering antenna array includes a metamaterial scattering antenna and a metamaterial reflector antenna.

21. The apparatus of claim 19 wherein the circuitry configured to compare the set of received signals to the set of reference signals includes:
circuitry configured to access a database of pre-recorded signals corresponding to the set of conditions.

22. The apparatus of claim 21 further comprising:
circuitry configured to perform a set of measurements to create the database of pre-recorded signals.

23. The apparatus of claim 19 wherein the circuitry configured to compare the set of received signals to the set of reference signals includes:
circuitry configured to access a database of calculated signals corresponding to the set of conditions.

24. The apparatus of claim 23 further comprising:
circuitry configured to calculate a set of signals corresponding to the set of conditions to produce the database of calculated signals.

25. The apparatus of claim 19 wherein the set of conditions includes a set of frequencies.

26. The apparatus of claim 19 wherein the set of conditions includes a set of relative positions of at least one of a scattering antenna and a reflector antenna in the array.

27. The apparatus of claim 19 wherein the set of conditions includes a set of relative orientations of at least one of a scattering antenna and a reflector antenna in the array.

28. The apparatus of claim 19 wherein the set of conditions includes a set of states of scattering elements in the surface scattering antenna array.

29. The apparatus of claim 19 wherein the circuitry configured to reconstruct an image based on comparing the set of received signals to the set of reference signals includes:
circuitry configured to use a compressive imaging algorithm to reconstruct the image.

30. The apparatus of claim 19 further comprising:
circuitry configured to send a set of signals to at least one of a scattering antenna, a reflector antenna, a source, and a detector to produce the set of conditions.

31. The apparatus of claim 30 further comprising:
circuitry configured to send at least one signal in the set of sent signals responsive to at least one received signal in the set of received signals.

32. An apparatus comprising:
a surface scattering waveguide antenna;
a surface scattering reflector antenna;
circuitry configured to set a series of conditions corresponding to the waveguide antenna and the reflector antenna, each condition in the series of conditions including an output frequency of the waveguide antenna, a scattering element configuration of the waveguide antenna, and a reflector element configuration of the reflector antenna, and wherein the series of conditions corresponds to a series of beam patterns created by the waveguide antenna and the reflector antenna; and
circuitry configured to receive a series of signals corresponding to an amount of energy detected by the waveguide antenna.

33. The apparatus of claim 32 further comprising:
circuitry configured to produce an image of an object that is illuminated by the series of beam patterns using a compressive imaging algorithm.

\* \* \* \* \*